US009980434B1

(12) United States Patent
Brown

(10) Patent No.: US 9,980,434 B1
(45) Date of Patent: May 29, 2018

(54) NETWORK FOR PLACING A PLURALITY OF LAWNMOWER COMPONENTS IN OPERATIVE COMMUNICATION

(71) Applicant: Hydro-Gear Limited Partnership, Sullivan, IL (US)

(72) Inventor: Alyn G. Brown, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 88 days.

(21) Appl. No.: 15/056,839

(22) Filed: Feb. 29, 2016

Related U.S. Application Data

(60) Provisional application No. 62/126,569, filed on Feb. 28, 2015.

(51) Int. Cl.
*G06F 13/00* (2006.01)
*G06F 13/38* (2006.01)
*G06F 13/40* (2006.01)
*A01D 69/02* (2006.01)
*A01D 101/00* (2006.01)

(52) U.S. Cl.
CPC .......... *A01D 69/02* (2013.01); *A01D 2101/00* (2013.01)

(58) Field of Classification Search
None
See application file for complete search history.

(56) References Cited

U.S. PATENT DOCUMENTS

| 4,328,494 | A  | 5/1982  | Goodall        |
| 6,230,089 | B1 | 5/2001  | Lonn et al.    |
| 6,263,269 | B1 | 7/2001  | Dannenberg     |
| 6,728,268 | B1 | 4/2004  | Bird           |
| 6,757,583 | B2 | 6/2004  | Giamona et al. |
| 6,851,067 | B2 | 2/2005  | Indefrey       |
| 6,943,521 | B2 | 9/2005  | Kurokawa et al.|
| 7,089,721 | B2 | 8/2006  | Turner et al.  |
| 7,511,711 | B2 | 3/2009  | Ing et al.     |
| 7,575,437 | B2 | 8/2009  | Mincek         |
| 7,705,553 | B2 | 4/2010  | Worrall        |
| 7,855,573 | B1 | 12/2010 | Yost           |
| 8,072,174 | B2 | 12/2011 | Campbell et al.|
| 8,301,714 | B2 | 10/2012 | Johnson et al. |
| 8,548,646 | B1 | 10/2013 | Gariepy et al. |
| 8,824,113 | B2 | 9/2014  | Casey          |

(Continued)

FOREIGN PATENT DOCUMENTS

| EP | 1211849 A2 | 6/2002 |
| EP | 1445700 A2 | 8/2004 |

(Continued)

OTHER PUBLICATIONS

U.S. Appl. No. 14/918,465, filed Oct. 20, 2015.

*Primary Examiner* — David E Martinez
(74) *Attorney, Agent, or Firm* — Neal, Gerber & Eisenberg LLP

(57) ABSTRACT

A network system is disclosed for use on a utility vehicle to connect multiple electronic components, such as input devices such as joysticks or similar mechanisms, motor controllers, sensors, switches, gauges and the like. The network system provides flexibility in the manner and order in which each of the components are connected while permitting each component to communicate with certain other components even when such components are not directly linked together.

8 Claims, 5 Drawing Sheets

(56) References Cited

U.S. PATENT DOCUMENTS

| | | | |
|---|---|---|---|
| 8,890,411 B2 | 11/2014 | Brown et al. | |
| 8,905,380 B2 | 12/2014 | Davis | |
| 9,026,711 B2 | 5/2015 | Kessler | |
| 9,164,934 B2 | 10/2015 | Reidt | |
| 9,236,910 B2 | 1/2016 | Eguchi | |
| 9,265,196 B2 | 2/2016 | Albinger et al. | |
| 2002/0049505 A1 | 4/2002 | Heinemann et al. | |
| 2004/0199703 A1* | 10/2004 | Wurth | G06F 12/0676 710/306 |
| 2006/0010844 A1 | 1/2006 | Angott | |
| 2006/0059880 A1 | 3/2006 | Angott | |
| 2008/0155073 A1* | 6/2008 | Swain | H04L 12/42 709/222 |
| 2012/0056572 A1* | 3/2012 | Bigler | H02K 5/225 318/570 |
| 2012/0131231 A1 | 5/2012 | Monreal | |
| 2015/0006025 A1* | 1/2015 | Rhoades | A01D 34/006 701/33.2 |
| 2015/0007541 A1* | 1/2015 | Albinger | A01D 69/02 56/10.2 A |
| 2015/0301978 A1 | 10/2015 | Messina | |
| 2015/0346259 A1 | 12/2015 | Jiang et al. | |
| 2015/0346260 A1 | 12/2015 | Jiang et al. | |

FOREIGN PATENT DOCUMENTS

| | | |
|---|---|---|
| EP | 2644780 A2 | 10/2013 |
| EP | 2728805 A2 | 5/2014 |
| WO | 1993015926 A1 | 8/1993 |
| WO | 2008079767 A2 | 7/2008 |
| WO | 2008099184 A1 | 8/2008 |
| WO | 2013100938 A1 | 7/2013 |
| WO | 2013102023 A1 | 7/2013 |
| WO | 2015129795 A1 | 9/2015 |

* cited by examiner

NETWORK FOR PLACING A PLURALITY OF LAWNMOWER COMPONENTS IN OPERATIVE COMMUNICATION

CROSS-REFERENCE TO RELATED APPLICATION

This application claims the benefit of U.S. Provisional Patent Application No. 62/126,569, filed Feb. 28, 2015. This prior application is incorporated herein by reference in its entirety.

FIELD

The present invention relates to utility vehicles, and more particularly to a communication network for an electronic control system capable of controlling drive systems for a utility vehicle such as a zero turn radius lawnmower.

BACKGROUND

Zero turn radius utility vehicles exist today in a wide variety of forms and types with lawnmowers being among the most popular. Typically, the prime mover for a zero turn radius lawnmower consists of an internal combustion engine. The output from the internal combustion engine is then coupled to one or more pulleys for turning at least two different drive systems that are driven by the rotary output of the engine. The first drive system is usually a pulley that drives a tool, such as a blade system that turns the blades of the lawnmower. Other tools driven by the tool driver include snow blowers, tillers, winches and the like that can be driven by the tool driver that is powered by the internal combustion engine.

Hydrostatic zero turn systems are known, including at least two outputs of a transmission or pair of transmissions that are independently controllable with respect to each other. By independently controlling the first and second outputs, one can control the operation of the first and second driven wheels.

Although such propulsion systems for a zero turn radius vehicles perform their function in a workmanlike manner and provide the basis for operation of a wide variety of highly functional and well received products on the market, room for improvement exists. In particular, room for improvement exists in being able to provide a propulsion system for a lawnmower that is more energy efficient. One way in which such efficiency can be achieved is through the use of a hybrid propulsion system.

Hybrid propulsion systems and components therefor that are useable with lawnmowers are described in U.S. patent application Ser. No. 14/918,465, filed on 20 Oct. 2015, the terms of which are incorporated fully herein by reference.

The hybrid propulsion system of the present invention preferably comprises an internal combustion engine whose primary purpose is to rotate an alternator to thereby generate electricity. The electricity so generated is stored in one or more storage batteries. Electricity from the storage batteries are then directed to one or more electric motors. The electric motors are operatively coupled to the driven wheels so that the rotation of the motor rotates the driven wheels. In such systems a gear reduction member can be provided to reduce the speed of the normal rotary output of an electric motor to a rotary output speed that is suitable for use in connection with the lawnmower.

One benefit of such a technique is that it has the potential to be more energy efficient than straight internal combustion driven power systems. Another benefit is that it has the potential to simplify the design of the vehicle by employing electronic controls in place of complex levers and linkages.

One difficulty encountered with a use of a plurality of electrical controls, and electrically actuated components relates to operatively coupling the various components and systems together. Coupling is necessary both for facilitating communication between the components and to provide a power source for those components that may require power to operate.

One way to provide power and communication between the various components is to couple the components together by hard wiring with conductors of appropriate gauges. Hard wiring is usually more reliable and cost-effective than wireless communications. Additionally, although communication signals can be easily transferred between components via a radio or wireless communication, it is often difficult to conduct power between components by any means other than the use of a wire conductor.

One of the difficulties with wiring components together relates to the number of wires that must be employed to handle the myriad of components that are employed for modem devices. Even allegedly "simple" devices such as zero turn radius lawnmowers can include a plurality of components that require a large number of wires being strung between components. The wiring necessary to appropriately serve all of the components has the distinct potential to create the need for large wiring harnesses that may be difficult to install correctly during the manufacture of a device. As such, one object of the present invention is to provide a device that has the potential to be wired with less complexity than some known devices.

Another issue that arises for designers and manufacturers of utility vehicles is designing such vehicles to be flexible enough to be able to accept additional, improved and newly developed electronic components. These may include electronic components include such things as global positioning devices, temperature sensors, tachometers, processors and the like. Examples of such processors include processors that control the operation of the device to automatically "drive it," by controlling the speed and direction of movement of the electrical motors, along with processors that may communicate with all of the various sensors, GPS devices and other electronic components on the utility vehicle, to transmit real time data relating to the operation of the vehicle via a phone or Wi-Fi link to a remote management or command center.

Another desirable feature of such a wiring system would be the ability of a system to quickly and easily adopt and be operatively coupled to a newly added or different controller.

In some embodiments, a "master controller" may not be a required component of the utility device, as each of the individual components may include enough processing power to handle the functions that the particular component must perform, along with communicating with other components of the utility vehicle so that the vehicle can perform all of its intended functions. However, in other situations, a master controller may be utilized to control one or more components, and may, from time to time, need to be upgraded to incorporate additional functionalities, or to enhance the performance of the controller by performing software upgrades and the like.

As such, one object of the present invention is to provide an electronic control system that has the flexibility to incorporate a wide variety of existing components, sensors and other devices requiring an electrical power or communication capability (collectively, "add on devices") that exist now, and that may exist in the future.

SUMMARY

In accordance with the present invention, a network system is provided for inter-operatively coupling a plurality of electronic components of a utility vehicle. The network system is provided for operatively coupling a plurality of electrical components of the utility device together to provide electrical power and communication capabilities among the electrical components of the network system. The network system comprises a first electrical component that includes a first processor and a first port; a second electrical component that includes a second processor and a second port; and a third electrical component that includes a third processor and a third port. A first conductor is provided that is coupled between the first and second components for conducting electrical power and communication signals between the first and second electrical components. A second conductor is provided that is coupled between the second and third components for conducting electrical power and communication signals between the second and third components. The processors of each of the first, second and third components are capable of communicating with any of the other of the first, second and third component, without the need of a separate controller such that the first electrical component can communicate with and influence the operation of the third electrical component without being coupled through a separate controller.

One feature of the present invention is that the first, second and third components can be coupled to each other to communicate among each other without the need of a controller. This feature has the advantage of significantly simplifying the wiring of components among each other.

As discussed above, the typical procedure is to couple each of the first, second and third components to a controller. In such an arrangement, a first component may then communicate with the third component only by communicating with the controller, which then itself communicates with the third component.

The present invention improves on this by enabling the user, for example, to couple the first component to the second component, and then couple the second component to the third component. The first component can then communicate with the third component, or any other component in the network, without being coupled to a separate component. This permits the user and designer to simplify the wiring, by coupling each component to its nearest network component, rather than requiring each component to have a wire extended all the way through a separate controller, that may be located rather remotely of one or more of the particular components of the network.

These and other features of the present invention will become apparent to those skilled in the art upon a review of the drawings and detailed description contained herein.

DETAILED DESCRIPTION

Figure 1:
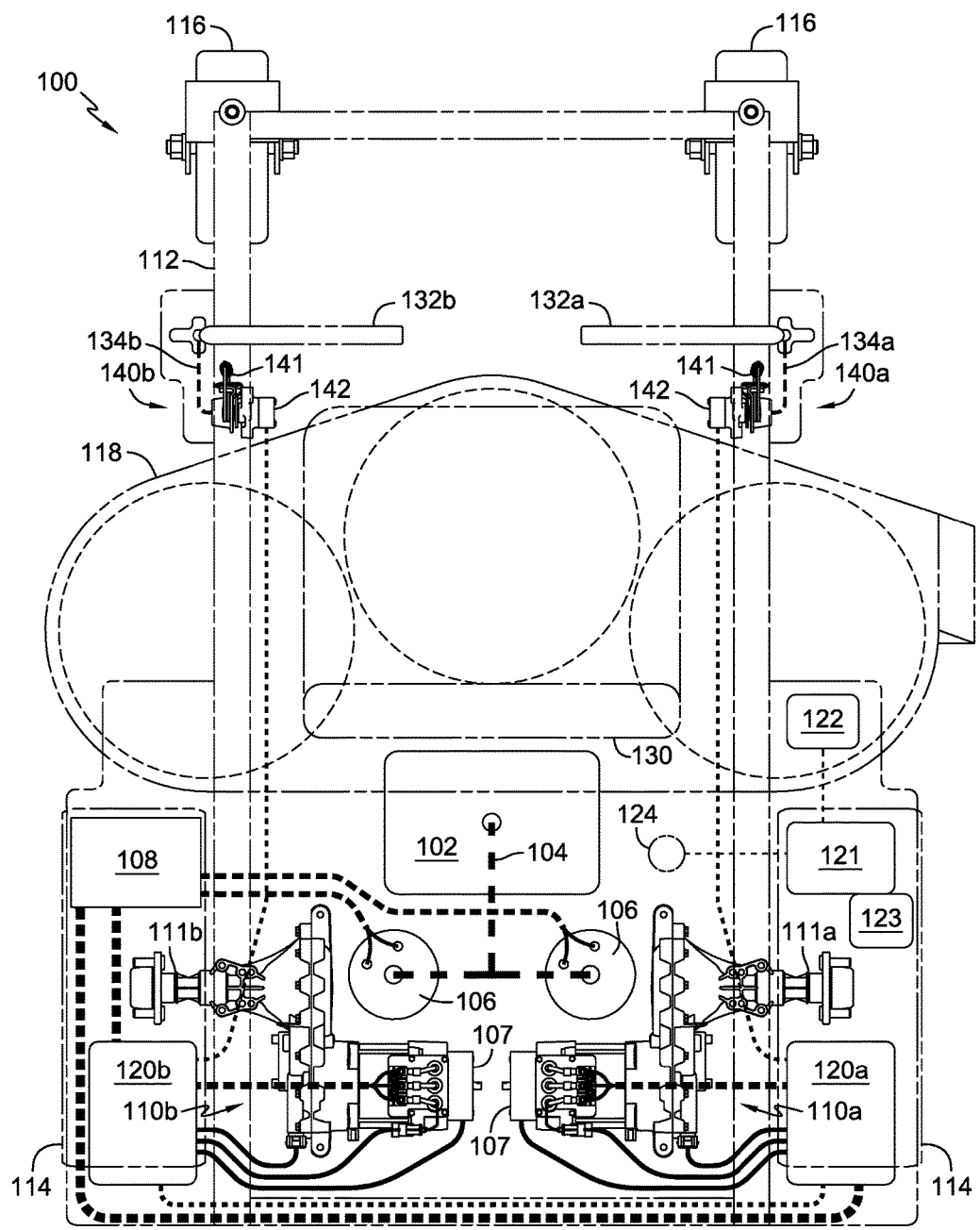
FIG. 1 is a schematic view of an exemplary hybrid zero turn radius lawnmower for use with the teachings herein.

The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles.

The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing reference numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Furthermore, certain views are side views which depict only one side of the vehicle (or one set of components of a multi set array of components), but it will be understood that the opposite side and other component sets are preferably identical thereto. The present specification is intended to be taken as a whole and interpreted in accordance with the principles of the present invention as taught herein and understood by one of ordinary skill in the art.

FIG. 1 depicts an embodiment of a zero turn hybrid utility vehicle 100, which by way of example only is a riding utility vehicle. Various components of vehicle 100 can be mounted on and supported by a frame 112. In particular, an engine 102, alternators 106, battery 108, electric zero turn transaxles 110a, 110b, and traction controllers 120a, 120b can be mounted on frame 112. Frame 112 also supports a deck 118, which may be of fixed height (relative to ground), ground-following, or height adjustable as known in the art. Deck 118 can include mowing blades and is intended to be representative of other ground engaging equipment such as brush cutters, aerators, and the like.

Operator seat 130 is positioned above deck 118 and is also atffixed to frame 112. Frame 112 is supported above ground by a pair of caster wheels 116 and a pair of driven wheels 114.

An engine 102, such as a gasoline or diesel type internal combustion engine drives the alternators 106 via a belt and pulley assembly 104. Alternators 106 generate electric power to charge a battery 108. The alternators could be replaced with generators. Battery 108 supplies electric power to electric zero turn transaxles 110a, 110b. Electric zero turn transaxles 110a, 110b provide rotational output through a pair of output shafts 111a, 111b to rotationally drive a pair of driven wheels 114.

Traction controllers 120*a*, 120*b* can control the speed and direction of driven wheels 114 by controlling the respective electric zero turn transaxles 110*a*, 110*b*, based on inputs from an operator (sitting in operator seat 130). Traction controllers 120*a*, 120*b* are mounted near the rear of vehicle 100 near transaxles 110*a*, 110*b* away from engine 120 to aid in cooling, although other locations are possible. The operator can provide speed and direction inputs through a pair of drive levers 132*a*, 132*b*. Each transaxle 110*a*, 110*b* may include a brake mechanism 107.

Drive levers 132*a*, 132*b* can connect to a pair of control assemblies 140*a*, 140*b* via mechanical linkages 134*a*, and 134*b*. Control assemblies 140*a*, 140*b* can each include a mechanical return to neutral ("RTN") mechanism 141 and a potentiometer 142 to communicate the position of drive levers 132*a* and 132*b* to traction controllers 120*a* and 120*b* respectively.

Based on the position of drive levers 132*a*, 132*b*, potentiometers 142 can provide varying inputs to traction controllers 120*a*, 120*b* so that electric zero turn transaxles 110*a*, 110*b* (and wheels 114) are driven as desired by the operator. In the absence of inputs from the operator. RTN (return To neutral) mechanisms 141 can force the drive levers 132*a*, 132*b* to a neutral position. Front caster wheels 116 react in response to the actions of rear driven wheels 114. An optional onboard processor 121 may be provided for processing various data streams fed to it by the sensors 124 and a GPS unit 123. Processor 121 may also include a transceiver 122.

Figure 2:
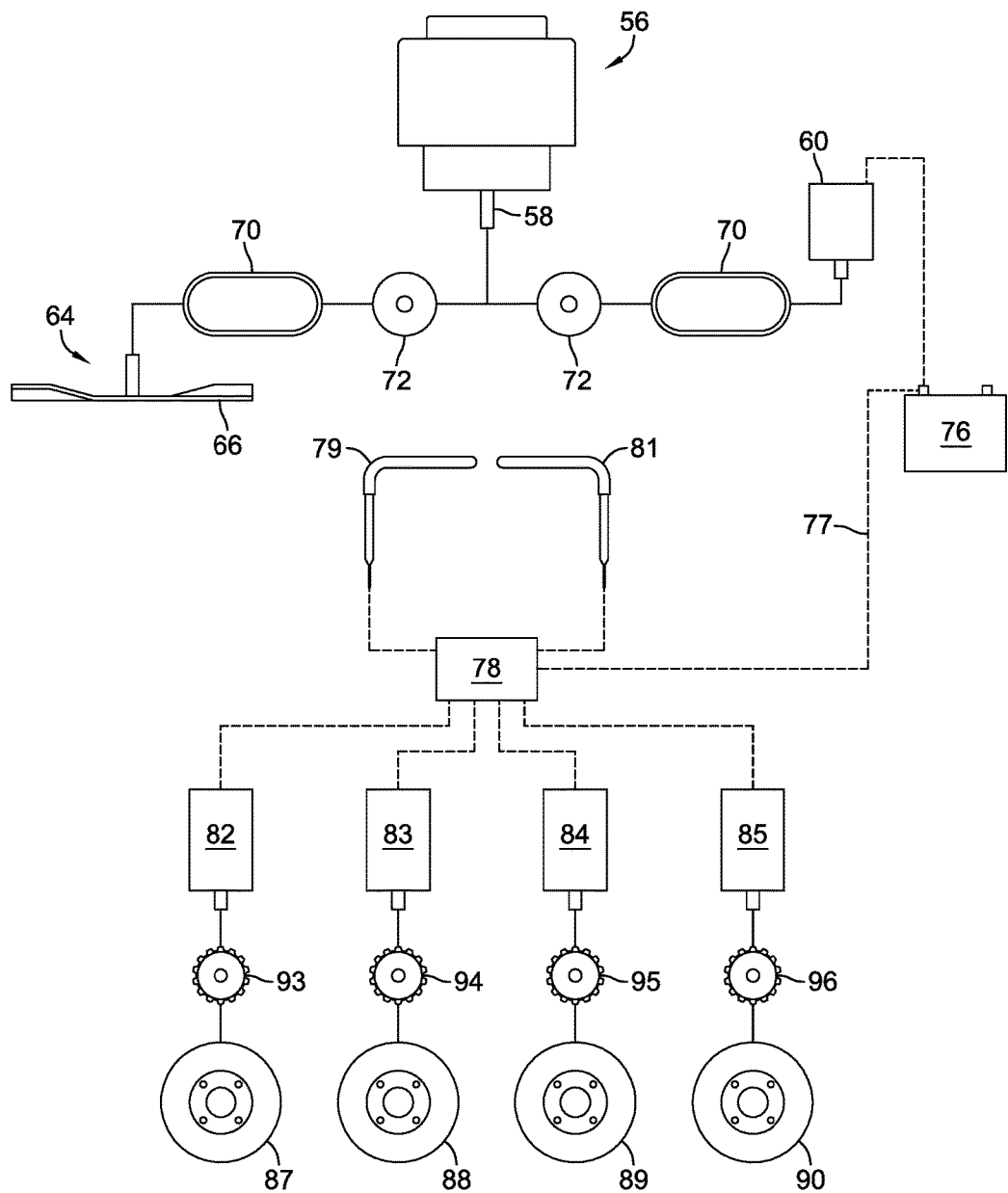
FIG. 2 is a schematic view showing the various components of an exemplary drive system.

Turning now to FIG. 2, an exemplary drive system is shown schematically. The internal combustion engine 56 contains a downwardly extending output shaft 58. The output shaft of engine 56 drives two primary devices. The first device driven by the output shaft is a generator or alternator 60 that generates electricity for operating the electric motors that drives the wheels of the utility device of the present invention. The other output device comprises a rotatable accessory output device 64. Such output devices may include blades 66 on a lawnmower, tines on a plow, or other attachments to which one may attach to the utility vehicle. These attachments may include rollers, sprayers or other power driven accessories.

The common feature shared by many mower attachments is that they are driven by a belt that is coupled either directly or indirectly to the output shaft 58 of internal combustion engine 56. The rotation of engine 56 turns a pulley 72 that, through a belt 70, actuates the accessories, such as the blades 66. The primary driving device that is driven by the engine 56 with the drive system of the current invention is alternator 60 provided for generating electricity which is then transmitted to a battery 76, for storage for later use.

Energy that is stored in battery 76 is then delivered by wiring 77 to a controller that controls the current from the battery, and directs the current to the proper component of the utility vehicle. User input devices 79, 81 are coupled to the controller 78 so that the user can control the action of the controller 78 and hence, direct where the output from battery 76 is directed. Information about the alternator 60, batteries 76, controller 78 and user input devices 79, 81 will be discussed in more detail below.

The output from the controller 78 is directed to one or more electric motors 82, 83, 84, 85. As shown in FIG. 2, there exist four electric motors including first electric motor 82, second electric motor 83, third electric motor 84 and fourth electric motor 85. The motor array shown in FIG. 2 contemplates a single motor being used for each of four wheels 87, 88, 89, 90 of a four wheel vehicle. The use of four electric motors 82, 83, 84, 85 is relatively uncommon than the relatively more common use of just a first 82 and second 83 motor for controlling first and second wheels 87, 88, with third and fourth wheels 89, 90 being non-driven, rather than driven wheels. For example, as shown in FIG. 1, the front two wheels 116 are not driven wheels. The driving of the vehicle is done by the first and second (left and right) rear driven wheels 114.

Each of the motors 82-85 is coupled to a gear box 93, 94, 95, 96 that in most cases, comprises a reduction gear box, so that the rotational speed (RPM) output of the motors 82-85 is reduced to a suitable rotational speed for driving the wheels 87-90. The gear boxes are coupled to their respective wheels 87-90.

It is usually advisable to provide a gear box between the output of the electric motors 82-85 and the respective first 87, second 88, third 89 and fourth 90 wheels, but is not necessary in all situations.

Figure 3:
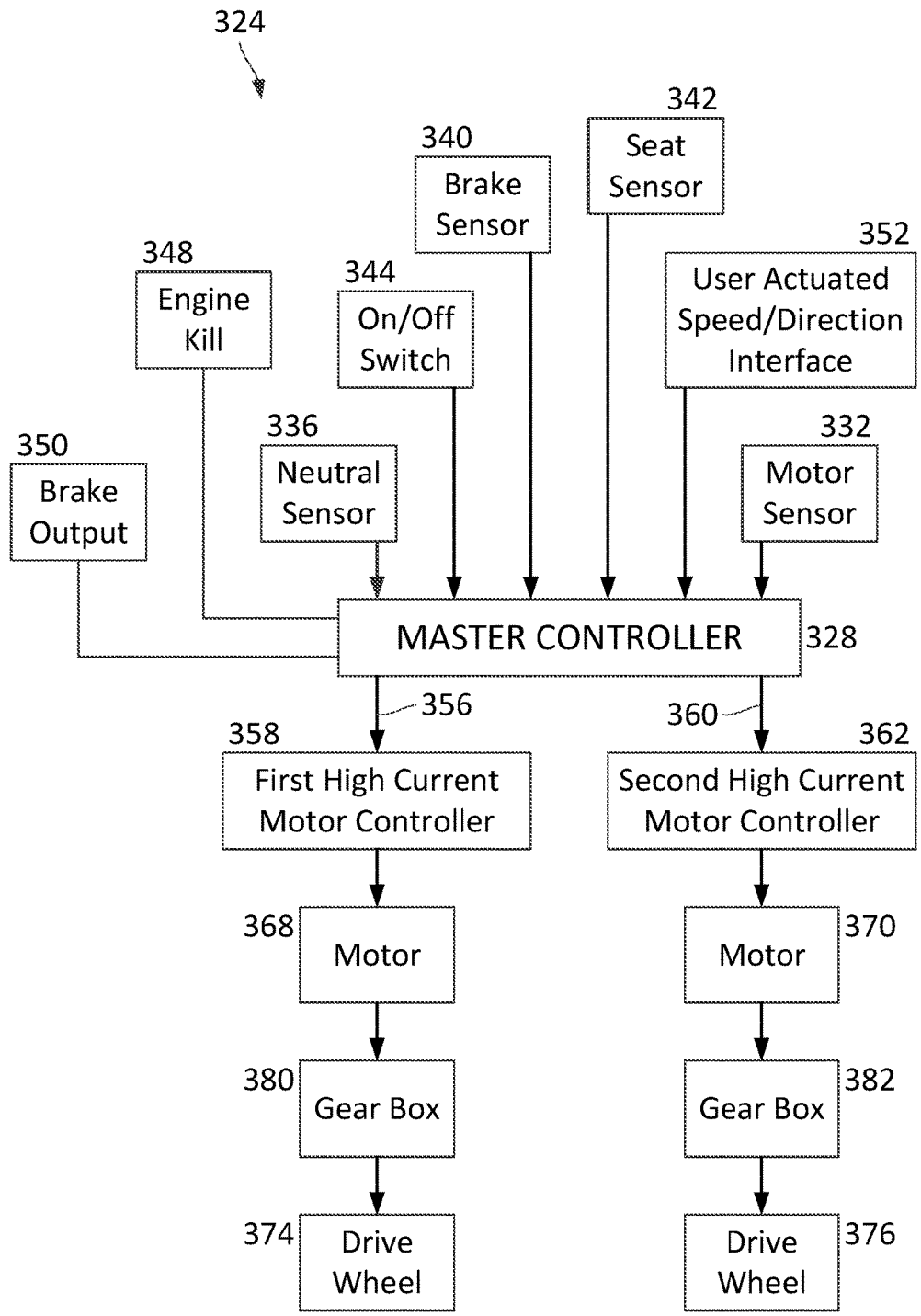
FIG. 3 is a schematic view showing the various control systems and components of a utility vehicle.

FIG. 3 shows a first embodiment of an electronic control system 324 having a master controller 328 that includes a plurality of input ports and a plurality of output ports. The input ports receive information from a variety of sources and sensors. The sensors include a motor sensor 332 that senses the operating condition and operating status of the various electric drive motors. Although a single motor sensor 332 is shown, it is more likely that the motor sensor comprises a plurality of motor sensors 332, with one sensor being coupled to each of the various electric drive motors (not shown).

The second sensor comprises a neutral sensor 336. A neutral sensor 336 is provided to tell the master controller 328 whether the device is in a "neutral" position. This neutral sensor 336 is employed as a safety device to ensure that the engine does not start with the device "in gear," because starting in gear would cause the vehicle to lurch forward or backward. Rather, the neutral sensor 336 can help to ensure that the vehicle will not jump forward or backward when starting.

Similarly, a brake sensor 340 provides a signal to the master controller 328 to tell the master controller 328 that the brake is actuated. This brake sensor 340 is also a safety device, as many devices require the brakes to be depressed before the engine of the vehicle begins operation, hence requiring the brake sensor 340 to be actuated.

Another sensor is a seat sensor 342 that detects the presence of weight on the vehicle seat. This sensor 342 is also employed as a safety feature to ensure that the engine is not started with the user not being appropriately positioned on the seat. A final input source is the on/off switch 344. The on/off switch 344 will tell the master controller 328 whether it has permission to actuate the engine and commence operation.

One of the outputs is an output that is referred to as the engine kill output switch 348. The engine kill output switch 348 enables the master controller 328 to control whether the engine is allowed to start, or whether the engine is allowed to continue running.

Normally, the engine kill switch 348 is defaulted so as to not allow the engine to run. The engine is not allowed to run until the master controller 328 senses that all the appropriate run conditions exist. For example, the master controller 328 will have the engine kill output 348 in the "kill the engine" mode unless the on/off switch 344 is turned to on, the brake sensor 340 recognizes the brake as being actuated, the seat sensor 342 recognizes that the seat has weight put on it, and the neutral sensor 336 senses that the device is in neutral. If all appropriate conditions are met, the engine kill switch 348 will move to an engine run position wherein the engine is allowed to run, and be turned on by the on/off switch 344.

There is also a brake output control 350 that is coupled to the master controller 328. The brake output control 350 can run in several different modes. For example, the brake output control 350 can work in conjunction with the engine kill switch 348. If the controller senses that a problem has arisen that should cause the engine to be shut off (such as if the user comes out of his seat), the master controller may send an output signal to the engine kill switch 348 to kill the engine, along with a signal to the brake output 350 to cause the brake to be actuated to cause the device to stop.

Another way in which the brake output 350 can function is to work in conjunction with the neutral sensor, so that if the device is sensed to be in neutral, the brake will be engaged. In such a situation when the user wishes to stop the device, the user places it in neutral. Although the placement of a moving vehicle in neutral will normally cause the device to continue to roll in the direction in which it is moving, the coupling of the neutral sensor 336 to the brake output 350 causes the brake to be engaged, so that by placing the device in neutral, one is effectively applying the brake, thereby causing the device to not be easily movable. The master controller 328 also has one or two inputs for receiving signals and commands from the user actuated speed and direction interface 352, such as the lever sticks.

Most importantly, the master controller 328 includes a first output 356 that is directed to a first motor controller 358, and a second output 360 that is directed to the second motor controller 362. In devices with multiple motors, there would also likely be a third and/or fourth motor output controller in addition to a first and second motor output controller shown in FIG. 3.

The first motor output controller 358 is a high current type of output controller, that is configured to deal with the high current outputs that are transmitted between the battery and/or alternator and the drive motors 368,370 that are coupled to the wheels 374, 376 of the vehicle. The first and second motor controllers 358, 362 are coupled to the first and second motors 368, 370 respectively, for controlling the operation of the first and second motors 368, 370. The rotational outputs for the motors 368, 370 are then transmitted through first and second gear boxes 380, 382, respectively, and ultimately to the first and second drive wheels 374, 376.

The propulsion system for driving the lawnmower is likely to be an electric hub motor that is coupled to a gear reduction member for driving the driven wheel. The hub motor 368 is preferably one of an AC motor, a DC brushless motor, or a DC brush motor. The hub motor has an output that is coupled to a gear box that has an output shaft (axle) that is coupled to a wheel of the utility device. The gear box reduces the rotational speed of the output of the hub to a suitable speed for turning the wheel at an appropriate speed and with sufficient torque.

Figure 4:
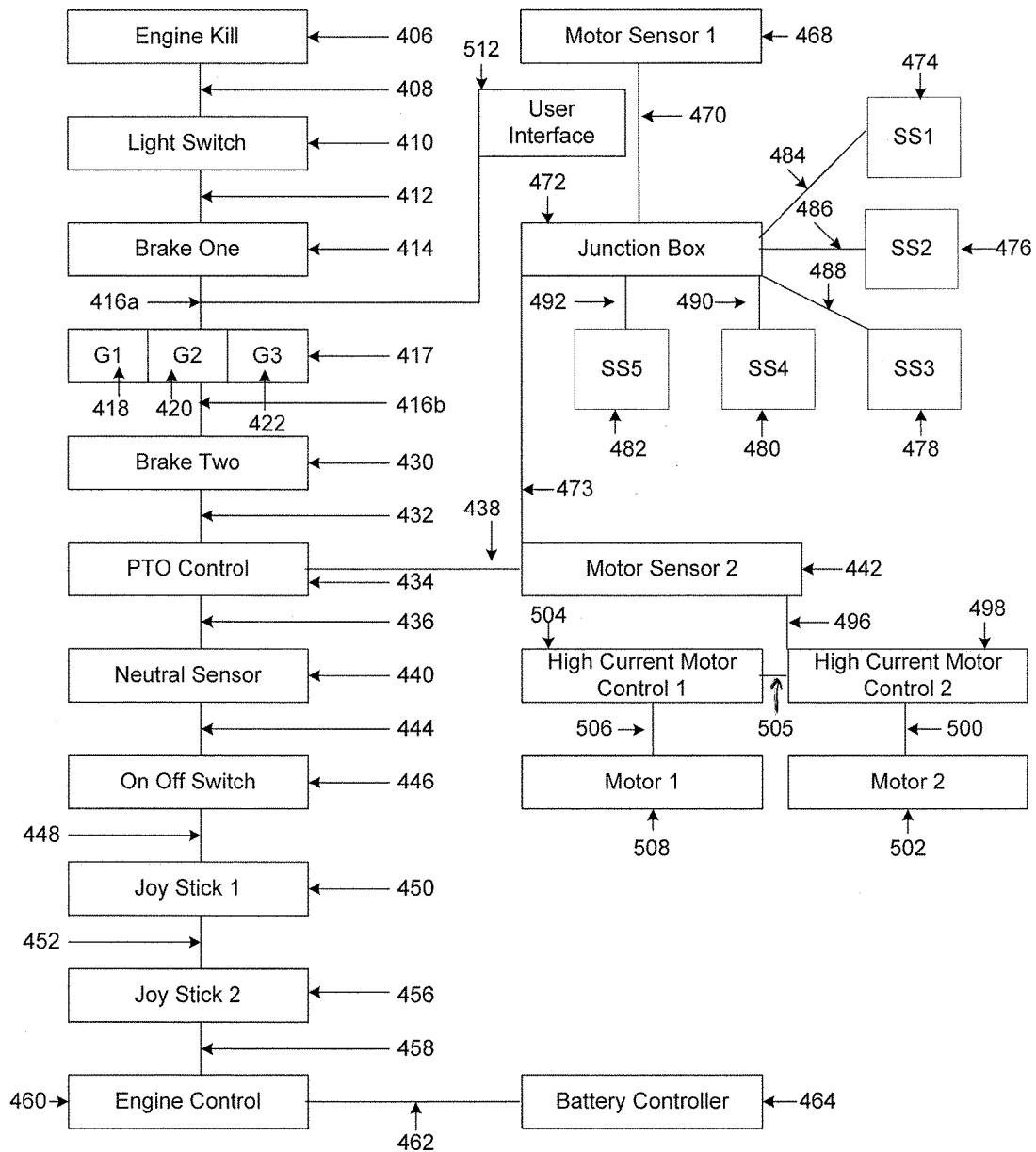
FIG. 4 is a schematic view of a plurality of components networked together in a system in accordance with the present teachings.

The networking system of the present invention is best described with regard to FIG. 4, which shows a plurality of electronic or electrically actuated components that may be found on a utility device, such as a zero turn radius lawnmower. The various components such as the engine kill switch 406, light switch 410, and others are characterized in that each of them includes appropriate circuitry that enables the device to achieve its intended function, as described above. Additionally, each of the devices, such as the engine kill switch 406 and light switch 410 should include a port that enables a conductor to be connected to the component, such as conductor 408 that extends between the engine kill switch 406 and the light switch 410. The conductor such as conductor 408 is preferably a standard, off-the-shelf conductor that includes sufficient wiring having a sufficient gauge to carry communication signals and/or current for power between the components, such as engine kill switch 406 and light switch 410.

For many of the components, the power required to drive the particular component is relatively small, and measured in fractional amps or milliamps. For such components, standard conductors of the type that are normally associated with these conductors having USB connector type ends will typically suffice. However, for those conductors that conduct a large amount of amperage, such as the conductors 506, 500 between the first and second high current controllers 504, 498 and respective motors 508 and 502 would probably be made of a larger (lower gauge) wire that has sufficient amperage carrying capacity to carry the current necessary to operate the large power consuming components, such as first motor 508 and second motor 502. It will be understood that independent conductors may be required for components requiring a large amount of amperage.

Preferably, the ports of the various components should comprise ports that are configured as commonly employed ports, such as USB ports, mini USB ports, HDMI ports, etc., so as to cut down on the expenses that are typically entailed with customer connectors (plugs). For example, most or all of the components that require low power can include female USB ports, and the plug of the conductor (e.g. 408) that plugs into the ports can be a conductor having a pair of male USB connector plugs on either end of the connector, so that in the case of conductor 408, a first plug of the conductor can extend into the USB receiving port of the engine kill switch 406, while a second plug of the USB connector of the conductor 408 can be received into the receiving USB port of the light switch 410.

Additionally, each of the components should have a processor capable of processing information. The processing capability need not necessarily be a large processing capability. Rather, the processing capability that each component should contain should be sufficient both to operate the component and to generate and receive a mating or handshake signal to find the component to which it is to mate and to then mate with and establish a communication protocol with the sound component. In addition to its processing capabilities, each component should have communication capabilities to enable the particular component to communicate with its appropriate counterpart component. Communication capabilities should be such that the kill switch when coupled to the network, can send a signal to other components of the network to find another component with which it should interact, and thereby be operatively coupled to.

For example, the engine kill switch 406 should be able to have sufficient communication abilities to communicate with the first and second motor controllers 504, 498, to be able to cause motor controllers 504, 498 to turn off in a situation wherein the engine needs to be killed, and the engine kill switch 406 is actuated to do so. Additionally (or alternately), the engine kill switch 406 can be designed to communicate with and be coupled to the on/off switch 446 of the utility vehicle, so as to be able to communicate with the on/off switch to turn the utility device "off," in the event that the engine kill switch 406 is actuated.

In the present invention, it will be noted that the various electronic components are all coupled together, so that any of the various components can communicate with any of the other various components within the network. However, this operative coupling together is not necessarily a direct connection wherein a conductor extends between the two components that are communicating with each other.

Nor is it a design wherein all of the conductors feed into a central controller, that then serves as a switching station for directing appropriate signals from the sending component to the desired recipient component that is being controlled by the sending component. Rather, conductors are directed between the adjacent or closest component to adjacent or contiguous components. Although for example, the engine kill switch 406 is coupled directly to the light switch 410 by conductor 408, the fact that the light switch 410 is coupled to the first brake controller 414, and thereby, directly or indirectly to every other component, means that the engine kill switch 406 need not be directly coupled to the component, such as the on/off switch 446 with which it desires to communicate. Rather, the engine kill switch 406 joins the network that can relay its signal from the engine kill switch 406 to the on/off switch, for example, which is the component that the engine kill switch 406 desires to communicate with.

Unless otherwise stated, the particular components perform the function that they were described to perform above in this application.

The components include an engine kill switch 406 that is coupled through a conductor 408 to a light switch 410. The light switch is coupled by a conductor 412 to a first brake controller 414, for operating the first brake (such as the left hand brake) on the utility vehicle of the present invention. The first brake controller 414 is coupled by a connector 416*a* to a gauge cluster including first gauge 418, second gauge 420 and third gauge 422. These gauges can include for example, a power gauge, an oil pressure, an amperage gauge and a temperature gauge, or may include a variety of other gauges that would be useful to use on the vehicle. The gauges are preferably designed as a gauge cluster, so that a single port will couple the gauge cluster 417 to its fellow components, rather than each of the gauges individually 418, 420, 422 being required to be coupled independently to an adjacent component. In such a case, a central processor to which each of the gauges 418, 420, 422 of the gauge cluster 417 are coupled can be employed or alternately, each of the gauges can be equipped with its own processor that communicates out of a single control processor port.

Conductor 416*b* conducts signals between the gauge cluster 417 and the second brake controller 430. A conductor 432 conducts signals between the second brake controller 430 and the power take off control switch 434. A pair of conductors 436, 438 emerge from the take off control switch 434 with one conductor 438 conducting the power take off control switch 434 to the second motor sensor 442. The other conductor 436 conducts communication signals between power take off control switch 434 and neutral sensor 440. Neutral sensor 440 includes a conductor 444 that conducts communication signals between neutral sensor 440 and on/off switch 446. The conductor 448 conducts communication signals between a first joystick 450 and the on/off switch 446. Joystick 450 serves as a first direction and speed controller for the vehicle.

A conductor 452 conducts signals between the first and second joysticks 450, 456 and a conductor 458 conducts communication signals between the second joystick 456 and a controller 460 for controlling the internal combustion engine of the device. A conductor 462 conducts communication signals between the engine controller 460 and the battery controller 464.

A first motor sensor 468 includes a conductor 470 for conducting signals between the first motor sensor and a junction box 472. The junction box 472 includes a plurality of ports for coupling the semi-master controller containing junction box 472 to a plurality of slave-like components 474-482. The slave components are shown here as sensors, and may or may not have any controller functionality, as the controller functionality may well be contained within the junction box 472. Alternately, the junction box 472 may not include any control facilities, but rather may be little more than a switch box that can accept signals from the various slave components 474-482 and then conduct these signals to an opposite port and conductor.

The various slave components include a first conductor 484 for conducting signals between junction box 472 and first seat sensor 474, and a second conductor 486 for carrying communications between the junction box 472 and a second seat sensor 476.

Additionally, there are three engine sensors 478, 480, 482 that each respectively include their own conductor 488, 490, 492 for delivering signals between the junction box 472 and the respective three engine sensors 478, 480, and 482. Illustratively, the engine sensors can comprise sensors such as a tachometer 478, a temperature gauge 480 and an oil pressure switch and/or gauge 482. The junction box 472 also includes a conductor 473 for conducting signals between the junction box 472 and a second motor sensor 442.

The second motor sensor 442 includes a conductor 496 for communicating signals between the second motor sensor 442 and a high current motor output controller 498. A communications conductor 505 extends between the second high current motor controller 498 and the first high current motor controller 504. A conductor 500 connects second motor controller 498 and second motor 502 and conductor 506 connects first motor controller 504 and first motor 508.

It will be appreciated that the selection of which component to couple a given component to appears to somewhat random. In practice, it is likely that a particular component will be coupled to that component that is in the closest physical relationship to the first component, so as to minimize wiring complexity and wiring costs.

Notwithstanding this, the networking system of the present invention allows anyone of the components to communicate with any of the other components. For example, the first brake controller 414 can communicate with the joystick 450, even though they are not directly coupled to each other.

Figure 5:
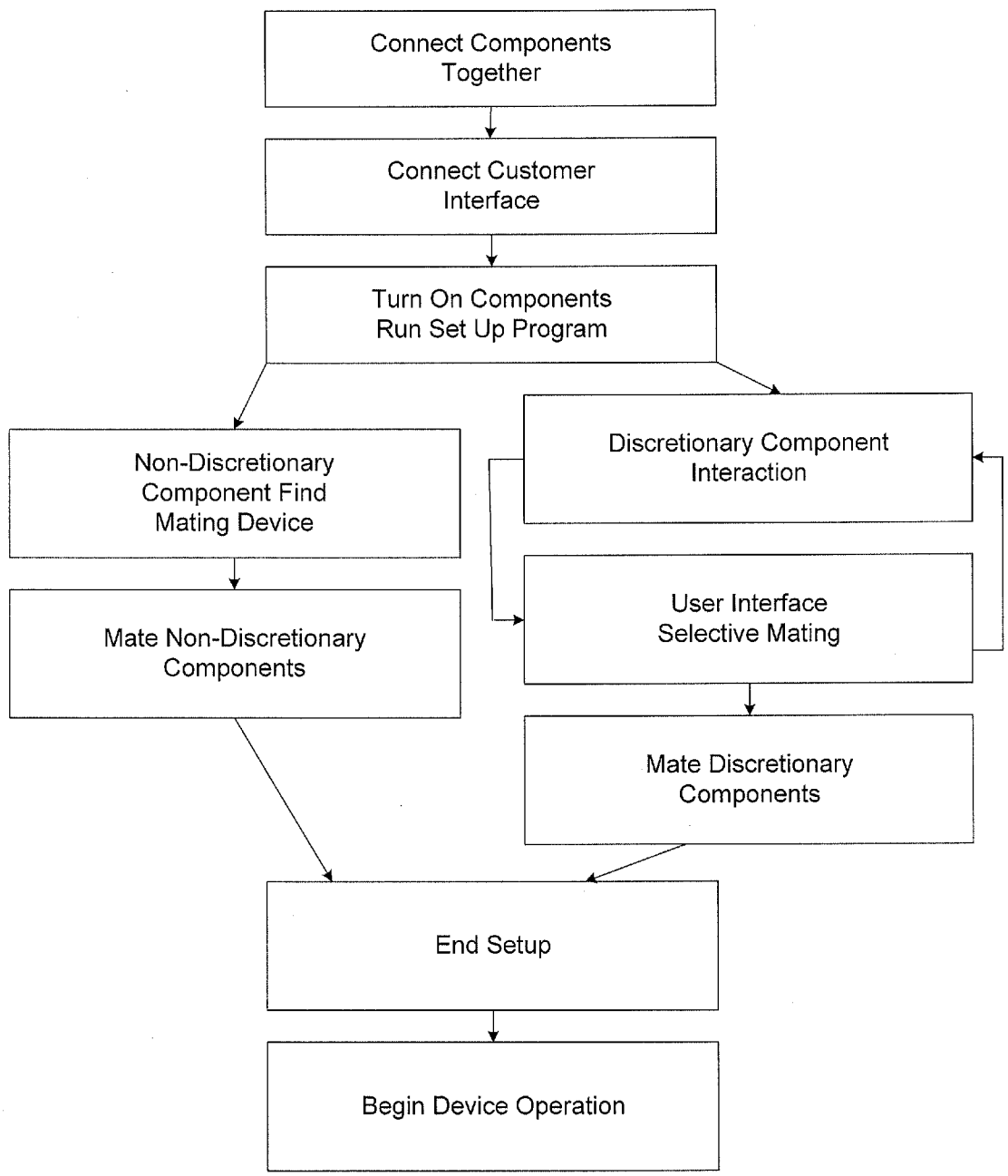
FIG. 5 is a flow chart view of a process useable with the disclosures herein.

Turning now to FIG. 5, a set-up procedure will be disclosed that sets forth the manner in which the various components communicate. The first step is for the user to connect the components together with the conductor.

The user connects the various components together in a manner similar to that shown in FIG. 4, wherein conductors extend between a port on one device and a port on a second device, with the particular device chosen to connect to usually covered by spatial considerations, rather than functional considerations.

A user interface, such as user interface 512 is then coupled to the system. The user interface 512 can be a permanently connected interface, or one that is coupled on a temporary basis. For example, one can couple a computer to a port, such as a communications port (not shown) on the vehicle, that would then allow the user interface 512 to communicate with all of the various components of the device.

The components are then turned on and the interface is then set to run the setup program for setting up the components for the first time.

When first set up, the components will be divided, conceptually, in the two major types of components. These components include discretionary components and nondiscretionary components. As used herein, non-discretionary components refer to those components that are capable of communicating and interacting with only one or one particular set of other components.

For example, the neutral sensor 440 is a non-discretionary component, as the only other components that the neutral sensor 440 communicates with are the on/off switch 446 and the transmission (not shown). The neutral sensor 440 senses the position of the transmission to determine whether it is in neutral, and then communicates this with the on/off switch 446 to ensure that the device is not allowed to be in the "on" position unless the neutral sensor 440 senses that the transmission is in neutral.

Another similar, non-discretionary switch is the engine kill switch 406, as it in a preferred embodiment, communicates only with the on/off switch 446. As such, if the engine kill switch is actuated to cease the operation of the engine, it communicates with the on/off switch 446 to turn the utility vehicle off, to thereby stop the first and second motor 508, 502, along with the internal combustion engine.

During setup, the initiation of the setup program will cause non-discretionary components to send out communication signals to find the appropriate component or set of components with which they are supposed to be mating, and communicating with during the operation of the device.

The other group of components is discretionary components. The discretionary components require some sort of user interaction in order to mate the component with its appropriate other component. For example, first and second joysticks 450, 456 are designed for mating with the first and second motor controllers 504, 498. However, which of the particular joysticks 450,456 mates with which of the motor controllers 498, 504, is somewhat discretionary. As such, during the setup program, the user interface may flash a display instructing the user to decide which motor controller he wishes to associate the first joystick 450 with, and would also query the user as to which motor controller 498 or 504 he wishes to associate the second joystick 456 with.

Although the user interface 512 should be controllable, such as with a touch screen or the like, and should be capable of displaying a message, it need not do so. For example, the user interface can be something as simple as lights on a joystick, that would light up to tell the user that he is to then engage the first joystick to associate it with a particular controller. For example, by moving the joystick to the left, the user could conceivably then associate the first joystick with the first or left hand motor 508.

A similar protocol could be used with the second joystick. During the setup procedure, the interface is used to enable the user to mate the discretionary components with the proper components to which the user decides to associate with. After both discretionary and non-discretionary components are so mated, the setup will end. After setup has ended, the user can then begin the operation of the device.

With the removable user interface, the interface device such as a computer can be removed after all of the discretionary and non-discretionary components are appropriately set up. With a permanent user interface, the interface can be employed with its other control and information display related purposes.

Preferably, the customer interface enables the user to go back in to re-set up the components if the user wishes to change the mating characteristics of the component, or if a new component is added.

Having described the invention in detail with reference to certain preferred embodiments, it will be understood that modifications and variations exist within the scope and spirit of the present invention.

What is claimed is:

1. A network system for inter-operatively coupling a plurality of electronic components of a utility vehicle, the network system comprising:
   a plurality of electrical components networked together to provide electrical power and communication capabilities among the plurality of electrical components, wherein the plurality of electrical components comprise:
   a first electrical component comprising a first input device for providing a first input to the utility vehicle, the first electrical component including a first processor and a first port;
   a second electrical component comprising a second input device for providing a second input to the utility vehicle, the second electrical component including a second processor and a second port;
   a third electrical component comprising a first motor controller including a third processor and a third port; and
   a fourth electrical component comprising a second motor controller including a fourth processor and a fourth port;
   a first conductor coupled between the first and second electrical components for conducting electrical power and communication signals between the first and second electrical components;
   a second conductor coupled between the second and third electrical components for conducting electrical power and communication signals between the second and third electrical components; and
   a third conductor coupled between the third and fourth electrical components for conducting electrical power and communication signals between the third and fourth electrical components;
   wherein each of the first, second, third and fourth processors are capable of communicating with any of the other of the first, second, third and fourth processors without the need of a separate controller such that the first electrical component can communicate with and influence the operation of the third electrical component without being directly coupled thereto, and the second electrical component can communicate with and influence the operation of the fourth electrical component without being directly coupled thereto.

2. The network system of claim 1, wherein the first input device includes a drive input position sensor configured to detect a position of a joystick or a drive lever of the utility vehicle, wherein the drive input position sensor is configured to post on a network via the first conductor position commands corresponding to the position and wherein the first motor controller is configured to respond to the position commands.

3. The network system of claim 2, wherein the second input device includes a seat occupancy sensor configured to detect presence of weight on a seat of the utility vehicle, wherein the second input device is configured to post on a network via the second conductor an activation signal corresponding to the presence of weight on the seat and wherein the second motor controller is configured to respond to the activation signal.

4. The network system of claim 3, wherein the first motor controller is configured to control a first electric drive motor and the second motor controller is configured to control a second electric drive motor in response to receiving, via the network, the position commands and the activation signal.

5. A network system for inter-operatively coupling a plurality of electronic components of a utility vehicle, the network system comprising:
   a plurality of electrical components permanently fixed to the vehicle and networked together via a network to provide electrical power and network communication and control capabilities among the plurality of electrical components, wherein the plurality of electrical components comprise:
      a first electrical component comprising a first input device for providing a first input to the utility vehicle, the first electrical component including a first processor and a first port;
      a second electrical component comprising a second input device for providing a second input to the utility vehicle, the second electrical component including a second processor and a second port;
      a third electrical component comprising a first motor controller including a third processor and a third port; and
      a fourth electrical component comprising a second motor controller including a fourth processor and a fourth port;
   a network conductor for conducting electrical power and milliamp network communication and control signals to and from the first, second, third, and fourth electrical components, the network conductor serially connecting adjacent ones of the first, second, third, and fourth ports;
   wherein each of the first, second, third and fourth processors are capable of communicating with any of the other of the first, second, third and fourth processors without the need of a separate controller such that the first electrical component can communicate with and control the operation of the third electrical component without being directly coupled thereto, and the second electrical component can communicate with and control the operation of the fourth electrical component without being directly coupled thereto.

6. The network system of claim 5, wherein the first input device includes a drive input position sensor configured to detect a position of a joystick or a drive lever of the utility vehicle, wherein the drive input position sensor is configured to communicate on the network position commands corresponding to the position and wherein the first motor controller is configured to respond to the position commands.

7. The network system of claim 6, wherein the second input device includes a seat occupancy sensor configured to detect presence of weight on a seat of the utility vehicle, wherein the second input device is configured to communicate on the network an activation signal corresponding to the presence of weight on the seat and wherein the second motor controller is configured to respond to the activation signal.

8. The network system of claim 7, wherein the first motor controller is configured to control a first electric drive motor and the second motor controller is configured to control a second electric drive motor in response to the position commands and the activation signal communicated on the network.

\* \* \* \* \*